US012447486B2

(12) United States Patent
Perez et al.

(10) Patent No.: US 12,447,486 B2
(45) Date of Patent: Oct. 21, 2025

(54) REMOVABLE ASSEMBLY FOR A DIFFUSING APPARATUS

(71) Applicant: CAELIMP, Labege (FR)

(72) Inventors: Yoann Perez, Sarrancolin (FR); Philippe Riviere, Toulouse (FR); Philippe Pichon, Villeneuve-de-Riviere (FR)

(73) Assignee: CAELIMP, Labege (FR)

( * ) Notice: Subject to any disclaimer, the term of this patent is extended or adjusted under 35 U.S.C. 154(b) by 961 days.

(21) Appl. No.: 17/617,357

(22) PCT Filed: Dec. 19, 2019

(86) PCT No.: PCT/FR2019/053207
§ 371 (c)(1),
(2) Date: Dec. 8, 2021

(87) PCT Pub. No.: WO2020/254733
PCT Pub. Date: Dec. 24, 2020

(65) Prior Publication Data
US 2022/0217963 A1 Jul. 14, 2022

(30) Foreign Application Priority Data
Jun. 18, 2019 (WO) .................. PCT/FR2019/051490

(51) Int. Cl.
B05B 7/16 (2006.01)
A01M 1/02 (2006.01)
(Continued)

(52) U.S. Cl.
CPC ............. *B05B 7/1613* (2013.01); *A01M 1/02* (2013.01); *A01M 1/2077* (2013.01);
(Continued)

(58) Field of Classification Search
CPC .... A01M 1/02; A01M 1/2033; A01M 1/2044; A01M 1/2061; A01M 1/2072;
(Continued)

(56) References Cited

U.S. PATENT DOCUMENTS 1,129,897 A * 3/1915 Owen ................. A01M 1/2044
239/45
2,140,516 A 12/1938 Cowan
(Continued)

FOREIGN PATENT DOCUMENTS

CN 103237470 A 8/2013
CN 109744578 A 5/2019
(Continued)

OTHER PUBLICATIONS

International Search Report for corresponding PCT application No. PCT/FR2019/053207, mailed May 4, 2020.
(Continued)

*Primary Examiner* — Sang Y Paik
(74) *Attorney, Agent, or Firm* — Notaro, Michalos & Zaccaria P.C.

(57) ABSTRACT

A diffusing apparatus for diffusing a substance in the vapor state into the surrounding air, in particular to a removable assembly of the apparatus that includes a storage container including an orifice and containing a liquid substance selected from semiochemical molecules, pheromones, allomones, kairomones, synomones and fragrances of natural or synthetic origin, and an inner cellular retaining member housed at least in a mouth area of the storage container that is adjacent to the opening and set back from the opening is disclosed. The removable assembly of the apparatus may include a dispensing member including a porous body
(Continued)

having an evaporation surface located outside the storage container. The substance may have a viscosity that varies according to temperature.

23 Claims, 14 Drawing Sheets

(51) Int. Cl.
| | |
|---|---|
| *A01M 1/20* | (2006.01) |
| *A01M 1/22* | (2006.01) |
| *A01M 7/00* | (2006.01) |
| *A01M 29/12* | (2011.01) |
| *A61L 9/03* | (2006.01) |
| *A61L 9/14* | (2006.01) |
| *B05B 7/22* | (2006.01) |

(52) U.S. Cl.
CPC .......... *A01M 7/0003* (2013.01); *A01M 29/12* (2013.01); *A61L 9/032* (2013.01); *A61L 9/14* (2013.01); *B05B 7/22* (2013.01); *A01M 7/0014* (2013.01); *A61L 2209/111* (2013.01); *A61L 2209/13* (2013.01)

(58) Field of Classification Search
CPC .. A01M 1/2077; A01M 29/12; A01M 7/0003; A01M 7/0014; A61L 2209/111; A61L 2209/13; A61L 9/032; A61L 9/042; A61L 9/122; A61L 9/125; A61L 9/127; A61L 9/14; B05B 7/1613; B05B 7/22
USPC .......................................... 392/324, 386–395
See application file for complete search history.

(56) References Cited

U.S. PATENT DOCUMENTS

| | | | | |
|---|---|---|---|---|
| 3,262,290 | A * | 7/1966 | Huber ...................... | F23D 3/08 |
| | | | | 431/328 |
| 8,483,553 | B2 | 7/2013 | Tollens et al. | |
| 8,833,366 | B2 | 9/2014 | Colombo et al. | |
| 9,616,149 | B2 | 4/2017 | Iwaki et al. | |
| 10,357,064 | B1 * | 7/2019 | Kleizo .................... | H05B 3/44 |
| 2004/0065749 | A1 * | 4/2004 | Kotary ................ | A01M 1/2072 |
| | | | | 239/44 |
| 2005/0284952 | A1 * | 12/2005 | Davis ...................... | A61L 9/037 |
| | | | | 239/45 |
| 2006/0043619 | A1 | 3/2006 | Brown et al. | |
| 2006/0120701 | A1 * | 6/2006 | Caserta ................ | A01M 1/2072 |
| | | | | 392/390 |
| 2011/0049259 | A1 | 3/2011 | Beland et al. | |
| 2011/0284655 | A1 | 11/2011 | Motylinski et al. | |
| 2013/0306065 | A1 | 11/2013 | Thorens et al. | |
| 2014/0369895 | A1 | 12/2014 | Turner et al. | |
| 2015/0314031 | A1 * | 11/2015 | Torres ..................... | A61L 9/127 |
| | | | | 239/43 |
| 2017/0072085 | A1 | 3/2017 | Gruenbacher et al. | |
| 2018/0000977 | A1 | 1/2018 | Mitchell | |
| 2018/0098573 | A1 | 4/2018 | Yu et al. | |
| 2019/0124983 | A1 | 5/2019 | Rogers et al. | |

FOREIGN PATENT DOCUMENTS

| | | |
|---|---|---|
| EP | 1846044 A0 | 10/2007 |
| FR | 3047900 A1 | 8/2017 |
| JP | H0584286 A | 4/1993 |
| JP | H0585276 U | 11/1993 |
| JP | 2002510228 A | 4/2002 |
| JP | 2003199473 A | 7/2003 |
| JP | 2004-313004 A | 11/2004 |
| JP | 2005229931 A | 9/2005 |
| JP | 2010148747 A | 7/2010 |
| JP | 2011224071 A | 11/2011 |
| WO | 03092750 A1 | 11/2003 |
| WO | 2006074562 A1 | 7/2006 |
| WO | 2008027537 A1 | 3/2008 |
| WO | 2008124959 A1 | 10/2008 |
| WO | 2011161464 A1 | 12/2011 |
| WO | 2012/74020 A1 | 5/2014 |

OTHER PUBLICATIONS

Chinese Office Action for Application No. 201980097529.0, issued on May 29, 2024, with translation.
Notification of Reasons for Refusal for corresponding Japanese application No. 2021 575217, dated Nov. 28, 2023 and English translation.
Brazil Patent Office—Preliminary Office Action—Jun. 14, 2023—see translation.

* cited by examiner

REMOVABLE ASSEMBLY FOR A DIFFUSING APPARATUS

TECHNICAL FIELD

The invention relates to the field of diffusing apparatus intended to diffuse a substance in the vapor state into the surrounding air, the substance being a liquid including at least one substance selected from semiochemical molecules, pheromones, allomones, kairomones, synomones and fragrances of natural or synthetic origin. In particular, the invention relates to a removable assembly that can be used in a diffusing apparatus of this kind.

Technological Background

[Compounds such as semiochemical molecules, pheromones, allomones, kairomones, synomones and fragrances of natural or synthetic origin may be used in numerous applications. In agrochemical applications semiochemical substances are for example used to drive off or to control populations of marauding animals.

US-A-20180000977A1 describes an evaporator apparatus for extending the range and the efficacy of the odors. The apparatus includes a removable container containing an odor.

U.S. Pat. No. 2,140,516 describes an electric vapor generator generating water vapor in an instantaneous manner, the vapor being able to contain a medication or a fumigant.]

SUMMARY

Some aspects of the invention stem from the idea of proposing a removable assembly for a diffusing apparatus, the diffusing apparatus being intended to diffuse a substance in the vapor state into the surrounding air, enabling low energy consumption to assure a long period of autonomy.

Some aspects of the invention stem from the idea of proposing a removable assembly for a diffusing apparatus that regulates a distributed substance flow rate through a porous body by simple temperature control.

Some aspects of the invention stem from the idea of proposing a removable assembly for a diffusing apparatus particularly adapted to use a substance of high value with a high accuracy and without loss of substance.

In the context of a costly substance, the substance comprising a pheromone, for example, taking liquid form at ambient temperature, wastage thereof must be avoided. Thus in this situation it is wished to feed to an evaporation surface of a porous distributor member a quantity of liquid sufficiently small for the flow to occur without formation of droplets.

The flow of the liquid through a porous body is governed when cold by Jurin's law and when hot by Darcy's law.

Darcy's law states:

$$Q = KA(\Delta H)/L,$$

where Q is the volume flow rate, K is the hydraulic conductivity, A is the area of the section under study of the porous body, $\Delta H$ is the piezometric height difference upstream and downstream of the porous body sample and L is the length of the porous body sample. The hydraulic conductivity is calculated using the formula:

$$K = k\rho g/\mu,$$

where k is the inherent permeability of the porous body, $\rho$ is the mass per unit volume of the liquid substance, g is the acceleration due to gravity and $\mu$ is the viscosity of the liquid substance.

Jurin's law corresponds to the formula:

$$h = (2\gamma \cos(\theta))/(r\rho g),$$

where h is the height of the liquid, $\gamma$ is the surface tension of the liquid, $\theta$ is the angle of contact between the liquid and the wall of the microchannels, $\rho$ is the mass per unit volume of the liquid, r is the radius of the microchannels and g is the gravity constant.

"Removable assembly" will designate an assembly including in particular consumable elements, in particular the liquid substance to be diffused, and able to be moved, inserted or withdrawn in one piece from a diffusing apparatus, as opposed to a fixed part of the diffusing apparatus that includes in particular members with a longer service life.

A removable assembly of this kind for a diffusing apparatus may be designed in various manners, on the basis of a container for storing the liquid substance and integrating with the latter a greater or lesser number of elements of the diffuser apparatus, in particular elements the function of which is to distribute the liquid substance outside of the storage container and/or elements the function of which is to generate and/or to direct a flow of air intended to evaporate the liquid substance. The choice to integrate an element of the diffusing apparatus in the removable part rather than in the fixed part may be based on a number of considerations. A first consideration is the mechanical integration of the element with the storage container, for example with the objective of limiting the overall size of the apparatus or the production cost. For example, the integration into the removable assembly of certain elements that cooperate to generate or to guide the flow of air may serve that objective. A second consideration is the functional relation between the element and the liquid substance to be distributed, for example with the objective of favoring the compatibility of the diffusing apparatus with a plurality of different substances with no risk of pollution or in other words with no undesirable mixing. For example, the integration into the removable assembly of certain elements that cooperate to convey the liquid substance may serve that objective.

In accordance with one embodiment the present invention proposes a removable assembly for a diffusing apparatus, the diffusing apparatus being intended to diffuse a substance in the vapor state into the surrounding air, the removable assembly including a storage container including an orifice and containing a liquid substance.

A removable assembly of this kind may be designed to diffuse various substances.

In accordance with one embodiment, said liquid substance includes at least one substance selected from semiochemical molecules, pheromones, allomones, kairomones, synomones and fragrances of natural or synthetic origin.

In accordance with one embodiment, the substance is a solution containing at least one sexual or other pheromone, an allomone, a synomone or a kairomone intended to provoke a positive or negative response in relation to the target species, the behavioral result of which may be sexual confusion, confusion of another kind, sexual attraction, attraction of another kind, repulsion of any kind, in arthropods, including arachnids, or including hexapods, including in particular insects, including harmful insects.

In accordance with one embodiment, the substance is a solution containing at least one pheromone or a sexual pheromone, an allomone, a synonome or a kairomone intended to provoke a positive or negative response in relation to the target species, the behavioral result of which may in particular be soothing, relaxation, pleasure or intimidation in mammal and bird classes.

In accordance with one embodiment, the substance includes a solvent chosen from isopropyl myristate, dipropylene glycol, dipropylene glycol monomethyl ether and an isoparaffinic hydrocarbon, for example isoparaffin L or P or N or V.

In accordance with one embodiment, the substance is a solution including at least one substance from the group formed by odoriferous agents used on humans or animals, semiochemical substances, cosmetic agents, essential oils, fragrances and phytosanitary and agricultural agents.

In accordance with one embodiment, the odoriferous agents usable on animals are chosen from fatty acids or the esterified form of said fatty acids such as methyl oleate, methyl palmitate, dimethyl azelate and dimethyl pimelate.

In accordance with one embodiment, the liquid substance has a viscosity greater than 1 cPa·s at 25° C., for example greater than 8 cPa·s at 25° C., and less than 1 cPa·s at 60° C.

In accordance with one embodiment, the substance has a boiling point between 30° C. and 400° C. at atmospheric pressure.

In accordance with one embodiment, said storage container further contains an internal cellular retention member impregnated with said liquid substance.

In accordance with one embodiment the cellular retention member includes a material chosen from felt, for example wool felt, and melamine foam.

In accordance with one embodiment, a plurality of cellular retaining members in contact are disposed in the storage container.

In accordance with embodiments, the cellular retention members may have different stiffnesses and/or different hardnesses and/or different densities.

In accordance with one embodiment, said inner cellular retaining member is accommodated at least in a mouth zone of said storage container adjacent to the orifice, said cellular retaining member being set back from said orifice.

In accordance with one embodiment, the cellular retaining member covers the complete section of the mouth zone adjacent to the orifice of the storage container.

Thanks to a cellular retaining member of the above kind, the liquid substance can be reliably retained in the container by capillarity without risk of uncontrolled flow provided that the storage container is not connected to the distributor member in the form of a porous body.

In accordance with one embodiment, a plurality of internal cellular retention members are disposed in said storage container, a first inner cellular retaining member situated in said mouth zone of said storage container being stiffer than a second inner cellular retaining member disposed at a distance from the mouth zone.

In accordance with one embodiment, a means for retaining said inner cellular retaining member is situated in said container and extends from an end of said storage container opposite said orifice to secure said cellular retaining member in order to retain it in place in said mouth zone.

In accordance with one embodiment, the means for retaining the inner cellular retaining member includes a rod fixed to the end of said storage container opposite said orifice. For example, a solid rod with a cruciform end, said end being in contact with the cellular retaining member.

In accordance with one embodiment, the storage container includes a retaining lip arranged around the orifice and projecting inward. The internal perimeter of the retaining lip therefore has an opening with smaller dimensions than the orifice. Those dimensions make it possible to contain the inner cellular retaining member set back in the storage container.

The removable assembly may include one or more elements that cooperate to distribute the liquid substance outside of the storage container. In accordance with one embodiment, said removable assembly includes a distributor member in the form of a porous body having an evaporation surface situated externally of said storage container to evaporate the substance into the surrounding air. In other words, the porous body comprises pores that constitute microchannels opening onto the evaporation surface.

"Microchannel" will denote a canalization the cross section of which has an area between $10^{-4}$ and $10^6$ $\mu m^2$. In accordance with one embodiment, said pores have a diameter between 0.01 and 10 μm.

In accordance with one embodiment the hollow body includes a wood, textile, ceramic or polymer wick.

In accordance with one embodiment, the porous body has a cylinder shape.

In accordance with one embodiment, the porous body has a porosity in an interior part of the hollow body lower than a porosity in an exterior part of the hollow body surrounding the interior part. This makes it possible to control the flow rate of the flow in the porous body with the low porosity and to increase exchanges with the air with the high surface porosity.

A distributor member of this kind may be connected to the orifice of the container in various ways, either directly or indirectly.

In accordance with one embodiment, a connection between the storage container and its associated distributor member is provided by means of piping.

In accordance with one embodiment suitable for a diffusing apparatus the fixed part of which includes the distributor member, said distributor member includes a hollow needle configured to pierce a film and/or to move a membrane forming a valve of said storage container and to convey the substance contained in the storage container to the evaporation surface, said film or said membrane being situated at the outlet of said orifice and being intended to be perforated.

In accordance with one embodiment, the needle is disposed at one of the ends of the porous body. A needle of this kind may also be employed in combination with a "self-healing" perforatable stopper housed in the orifice of the storage container, that is to say a mass of elastic material that elastically closes the perforation produced by the needle so that no flow occurs after the withdrawal of the latter.

In accordance with one embodiment, said film is made of elastomer or a metal film.

In accordance with one embodiment, said distributor member is positioned at the outlet of said orifice and the porous body is assembled in sealed manner to the container and has an end portion engaged in the orifice so as to come into contact with said cellular retaining member.

Thanks to the above features, the distribution of the liquid substance between the container and the evaporation surface may be produced by direct contact of the porous body with the retaining member, that contact generating capillary tension.

In accordance with one embodiment, the end portion includes a lug arranged on an upper part of said porous body and extending along a longitudinal axis of the porous body and configured to receive the substance through contact with the cellular retaining member.

In accordance with one embodiment, said removable assembly includes at least one heating member enabling heating of said porous body and an electric contact associated with the heating member and intended to make an electric connection with a fixed part of the diffusing apparatus.

In accordance with embodiments, the removable assembly or the fixed part includes at least one temperature sensor measuring the temperature of the distributor member and/or the temperature of the flow of air. In accordance with one embodiment the distributor member is equipped with a temperature sensor, for example at the level of a free end.

The temperature sensor may for example be an expansion thermometer or a thermistor.

In accordance with one embodiment the heating member and the storage container are disposed on respective opposite sides of the distributor member in the removable assembly.

In accordance with one embodiment, the heating member is placed directly on a surface of the porous body.

In accordance with one embodiment, the porous body includes at least one recess accommodating at least a part of the heating member.

In accordance with one embodiment, the heating member is configured to regulate a flow rate of the substance through the distributor member by modifying a viscosity of the substance without reaching the boiling point of the substance.

In accordance with one embodiment, a setpoint temperature is defined as a function of the substance.

The flow of the liquid substance may be controlled in various ways. The porous distributor member in particular enables implementation of control of the flow of the liquid substance that is based essentially on the temperature of the porous body.

To that end, it is wished that at ambient temperature, without heating the porous distributor member, the hydraulic conductivity K be too low for a flow to occur, that is to say that the situation is a so-called "capillary" situation.

When hot, on the other hand, it is desirable that the flow be sufficient to produce a spreading of the liquid substance over the exterior surface of the porous body, which forms the evaporation surface, and that the liquid adhere to that surface. The layer of liquid adhering to the surface modifies the piezometric height difference $\Delta H$ and therefore leads to cutting the flow rate of the flow because the hydraulic conductivity K has reached a maximum value. In other words the hot flow, that is to say the flow at the temperature imposed by the heating member, is produced only to the degree that the layer of liquid adhering to the surface is concealed by evaporation and no droplets are detached from the surface of the porous body.

The more important parameters are therefore the viscosity of the fluid, its surface tension and the temperature of the porous body.

In one embodiment, cos θ is positive, that is to say the substance wets the distributor member, which is for example made of ceramic, the mass per unit volume of the liquid is between 0.6 and 1 $g/cm^3$, and the radius of the microchannels is between 5 nm and 1 μm.

When cold, that is to say at an ambient temperature below a temperature threshold, the area of the evaporatable liquid is therefore very small: it is the sum of the sections of the microchannels opening onto the evaporation surface. It is therefore possible to obtain a state in which the liquid substance is set back in the hollow body with no possibility of flow. In this state the evaporation when cold depends on the volatility of the liquid and may be substantially zero if that volatility is sufficiently low. The temperature threshold depends on the physical properties of the hollow body (porosity, section of the pores), the physical properties of the liquid (viscosity, surface tension), and motive forces liable to generate a flow (gravity, pressure).

The reduction of the dynamic viscosity of the substance by the heat furnished by a heating member enables a fluid to circulate in the distributor member in accordance with Darcy's law and then to spread on the surface of said distributor member. With no input of heat, the flow is fixed because the sum of the adhesions in the distributor member follows Jurin's law. In other words, flow is allowed through the distributor member when hot, because of the dynamic viscosity reduction induced by the rising temperature, but retained at the surface by the force of adhesion between the fluid and the surface of the distributor member, as a consequence of the wettability of the fluid on the evaporation surface. At room temperature the force of adhesion between the fluid and the surface of the microchannels in the hollow body is such that the liquid remains confined in the distributor member.

During flow, more energy is required to form a droplet that will be detached than to maintain the liquid substance in the distributor member and the storage container. This implies two conditions:

1. the dynamic viscosity of the substance must be not be too low within the temperature range that can be reached with the aid of the heating member, and
2. the liquid leaving the storage container must be in equilibrium with atmospheric pressure, which can be brought about in a number of ways. For example, the part of the storage container with no liquid is depressurized. Alternatively this equilibrium is assured by a pressure management system of the part with no liquid.

In accordance with one embodiment, said substance has a viscosity varying as a function of temperature, said viscosity and the surface tension of the liquid substance being such that the acceleration due to gravity is exerted from the orifice in the direction of the porous body, said substance being unable to flow through said porous body at an ambient temperature less than a first temperature, the first temperature being greater than 0° C., and said substance being able to flow through said hollow body at a second temperature higher than said first temperature.

The first temperature may be fixed in various ranges. If the diffusing apparatus is intended to be used outdoors, the first temperature will in particular be chosen as a function of local climate data. In accordance with embodiments, the first temperature is for example between 1° C. and 50° C., or between 5° C. and 40° C., or between 10° C. and 35° C., or between 15° C. and 25° C.

The removable assembly may include elements that cooperate to generate and/or to direct a flow of air intended to evaporate the liquid substance. In accordance with one embodiment, said removable assembly includes an air flow guide situated at the periphery of said orifice.

In accordance with one embodiment, said air flow guide is intended to guide a flow of air in a direction tangential to the evaporation surface or to the intended location of the evaporation surface and said removable assembly includes sealing elements for producing sealed connections between the container and said flow guide and between the flow guide and said porous body.

In accordance with one embodiment, the removable assembly includes a tubular chute extending around the porous body or the location intended for the porous body, said vein enabling the flow of air to be guided over said porous body.

In accordance with one embodiment, said storage container has an elongate shape in an axial direction, said orifice being situated at an axial end of the storage container, the evaporation surface of said porous body being parallel to the axial direction, said flow guide including a plurality of fins parallel to the axial direction and disposed around said container.

In accordance with one embodiment, said removable assembly comprises all or part of an air mixer chamber, said air mixer chamber extending all around said container. In one embodiment the removable assembly comprises an upper wall of the air mixer chamber, the upper wall extending all around the storage container.

According to one embodiment, said air mixer chamber includes an opening enabling connection to a ventilator.

In accordance with one embodiment, said air mixer chamber includes a fan and an electric connector, said fan being positioned in such a manner as to generate a flow of air in said air mixer chamber, said electric connector being intended to be associated with an electrical connector in a fixed part of the diffusion device to power the fan. For example the air flow rate of the fan may be between 0.2 and 60 m$^3$/h.

In accordance with one embodiment, said flow guide features a plurality of channels opening onto the mixer chamber and oriented in a direction tangential to the evaporation surface or to the intended location of the evaporation surface.

In accordance with one embodiment, said removable assembly includes a flange projecting around the storage container and adapted to cover an opening in a fixed part of the diffusing apparatus, said opening being intended for the insertion of said removable assembly in the fixed part of the diffusing apparatus.

In accordance with one embodiment, the removable assembly includes an air flow rate regulator member configured to control the fan in order to regulate a flow rate of air in said aeration chamber and/or said air flow guide.

The storage container may be produced in various ways.

In accordance with one embodiment, said storage container includes a pressurization vent establishing communication between the interior space of the storage container and the surrounding air.

In accordance with one embodiment, the removable assembly includes an outer storage container and an inner storage container accommodated in the exterior container, said inner storage container being connected to the distributor member via the orifice and including a vent connected to the atmosphere at an end opposite the orifice, a communication opening between the outer storage container and the inner storage container being provided in the mouth zone in the vicinity of the orifice, the outer storage container having no opening other than the communication opening. One or more cellular retaining members is or are preferably disposed in the inner storage container and/or the outer storage container.

In accordance with one embodiment suitable for a diffusing apparatus the fixed part of which includes the distributor member, the removable assembly includes a stopper, said stopper being disposed to close said orifice in sealed manner during transportation of said removable assembly. For example, when the apparatus is not being used, that is to say before the container has been connected to the distributor member or after it has been disconnected from the distributor member, a storage container of this kind may be provided with a stopper arranged on the drain orifice.

In accordance with one embodiment the removable assembly includes a seal arranged around the orifice in such a manner as to establish a sealed connection between the storage container and the distributor member.

In accordance with one embodiment, the removable assembly includes a mechanical retaining means enabling stabilization of the removable assembly in said fixed part of the diffusing apparatus. For example, the removable assembly is mounted in said fixed part of said diffusing apparatus by screwing or clipping.

In accordance with one embodiment, the storage container has no opening other than the orifice, said storage container containing, as well as the liquid substance, a gas phase occupying at least 20% of the volume of the storage container.

In accordance with one embodiment, the removable assembly comprises a mechanical polarization means to facilitate the insertion of the removable assembly in its operating position into the fixed part of the diffusing apparatus.

In accordance with one embodiment, said porous body is configured to establish a thermal junction with heating elements of the diffusing apparatus.

In accordance with one embodiment, said removable assembly is arranged as a contact junction between the cellular retaining member and the distributor member during its insertion into the fixed part of the diffusion device.

In accordance with one embodiment, the orifice of the container connected to the distributor member is oriented downward, that is to say in the direction of the acceleration due to gravity, when the apparatus is in its position of use.

The present invention also has for object a diffusion apparatus including said removable assembly according to any of the above embodiments and a fixed part including a casing that defines a housing in which said removable assembly is inserted in a functioning position enabling diffusion of the substance in the vapor state into the surrounding air.

In accordance with embodiments, said fixed part includes an external casing and essentially all the elements of the diffusing apparatus that have not been integrated into the removable assembly, namely, separately or in combination and in a non-exhaustive manner: a flow guide, a chute, a mixer chamber or chamber part, a fan, a distributor member, a heating member, a communication module, a control device, for example in the form of an electronic card, a fixing means for fixing the removable assembly in the housing, for example by clipping or screwing it.

A lid of the casing may be integrated into the fixed part or the removable assembly, for example in the form of a flange attached to the storage container.

In accordance with embodiments, the fixed part or said removable assembly includes at least one electronic regulator element configured to regulate the heating member.

In accordance with one embodiment, the electronic regulator element includes at least one electronic card and at least one electric resistor electrically energized by the electronic card. The electric resistor may be disposed on said electronic card or remote therefrom.

In accordance with one embodiment, the electronic regulator element is configured to control the heating member as a function of a setpoint temperature in the distributor member.

In accordance with one embodiment, the removable assembly comprises a means for identifying the substance stored in the container, for example a digital and electromagnetic means such as a radio frequency identification (RFID) chip or an analog means such as a barcode or other marking.

In accordance with one embodiment, the electronic regulator element is connected to a detector disposed in the fixed part and configured to detect a marking at the level of the storage container indicating the substance contained in the container and the control device determined as a function of said marking, at least one operating parameter of the device selected from the setpoint temperature, an air flow rate and time indications defining a stop/go cycle. Such time indications include for example cycle start dates, cycle end dates, cycle durations, inter-cycle duration, etc.

In accordance with one embodiment, the electronic regulator element includes a memory storing a table of values associating substances with setpoint temperatures.

In accordance with one embodiment, the fixed part further includes a communication module to provide wired or wireless communication with a data server, for example in order to modify the table of values or to update the regulation program.

In accordance with one embodiment, the fixed part includes housings to receive a plurality of storage containers each containing a liquid substance.

BRIEF DESCRIPTION OF THE FIGURES

The invention will be better understood and other aims, details, features and advantages thereof will become more clearly apparent in the course of the following description of particular embodiments of the invention given by way of nonlimiting illustration only with reference to the appended drawings.

DESCRIPTION OF EMBODIMENTS

Embodiments of a diffusing apparatus intended to diffuse a substance in the vapor state into the surrounding air will now be described.

Figure 1:
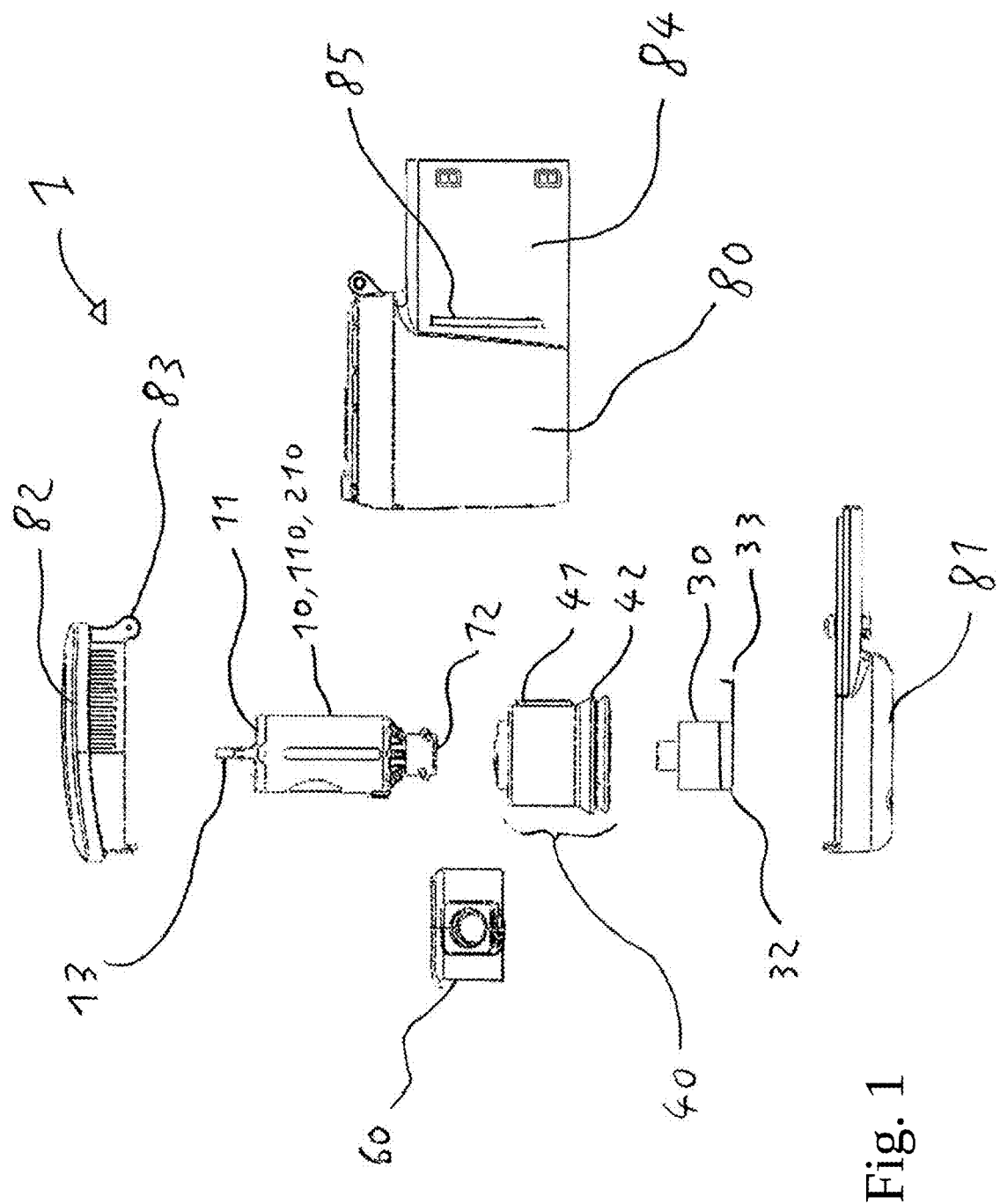
FIG. 1 represents an exploded view of a diffusing apparatus that can be produced in the form of a fixed part of a removable assembly.
Figure 2:
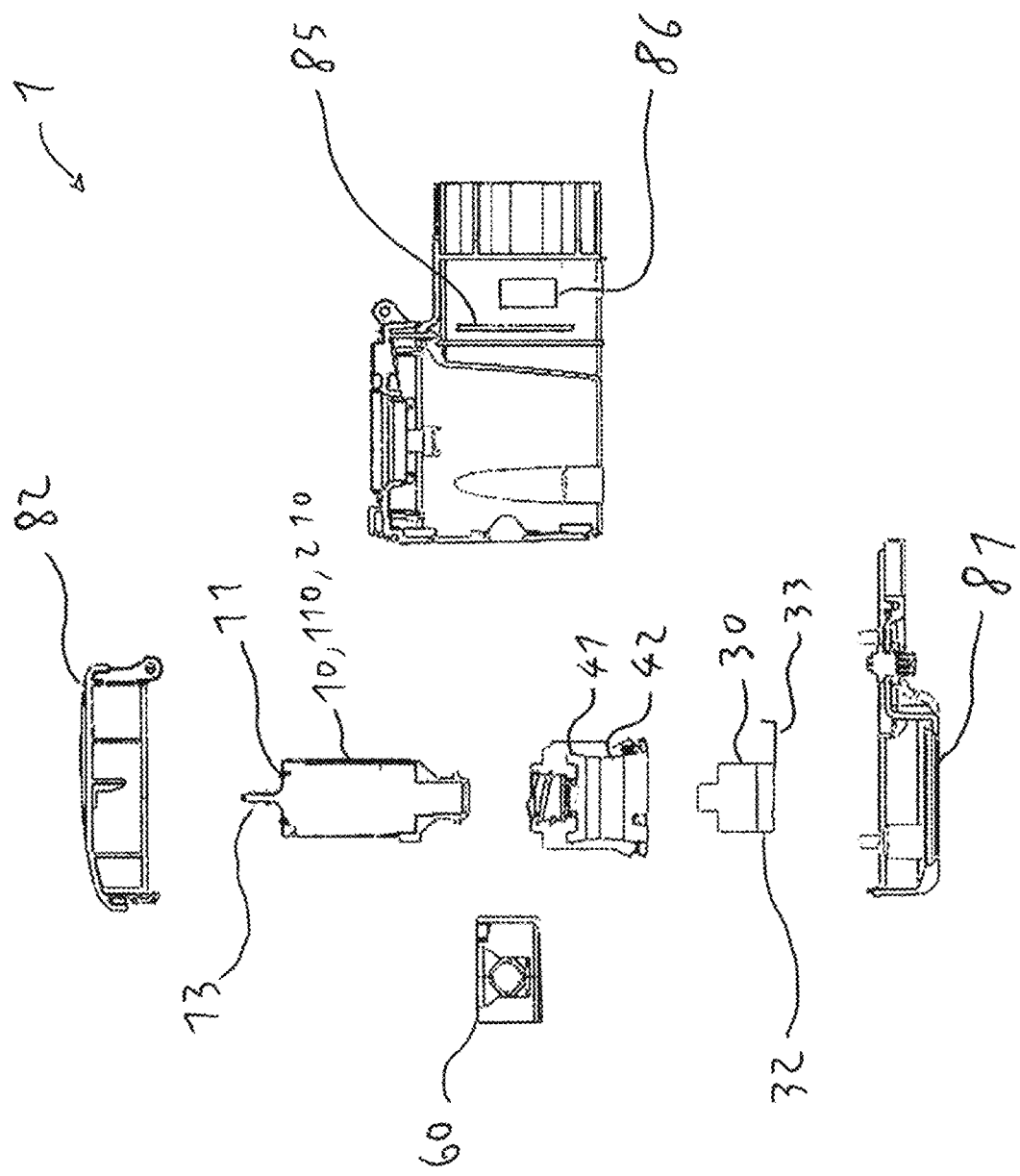
FIG. 2 represents an exploded view in section of the diffusing apparatus from FIG. 1.

FIGS. 1 and 2 illustrate a diffusing apparatus 1 constituted of elements represented here in an exploded perspective view. A cylindrical storage container 10, 110, 210 contains the liquid substance. The storage container 10, 110, 210 includes a cylindrical hollow body 17 closed at its upper end by a fluid-tight end-piece 11 that carries a holding tab 13 in its upper part. A lower part of the cylindrical hollow body 17 includes an orifice 12. The orifice enables communication of the liquid substance to the exterior of the storage container 10, 110, 210. The diffusing apparatus 1 includes an air guide part 40. The air guide part 40 includes a flow guide 41 associated with a chute 42 intended to be arranged around the orifice 12 of the storage container 10. An air mixer chamber 60 is intended to be positioned around the storage container 10, 110, 210 and to be in communication with the flow guide 41. The mixer chamber 60 may extend over all or part of the height of the storage container 10, 110, 210. A porous body 30 includes a lug 31 projecting from its upper face and is intended to penetrate the orifice 12 or to be connected thereto by a pipe that is not represented.

The lower part of the porous body 30 includes a heating element 32 enabling heating of the porous body 30 and an electric connector 33 intended to be connected to an electronic card 85 arranged in the casing 80. In the position of use the electric connector 33 is connected to the electronic card 85 and/or to an energy source 86 and enables supply of electric current and/or control signals. The control signals may be generated by the electronic card 85, for example by use of a control program defining a stop/start cycle of the heating element 32, start of cycle dates, end of cycle dates or cycle durations. The energy supply may take various forms such as a battery, a connection to an external electrical mains supply and/or a solar panel.

The casing 80 includes a lid 82 including hinges 83, a bottom piece 81 including an opening to the exterior environment and a fixing part 84. The lid 82 may be pivoted between a closed position and an open position, which enables replacement of the storage container 10, 110, 210 when the latter has been emptied of its substance to be diffused. In the closed position the lid 82 can also come to press on the holding tongue 13 in order to retain the storage container 10, 110, 210 in the casing 80 in a stable manner.

In accordance with one embodiment the diffusing apparatus 1 is produced in two parts: a removable part including at least the storage container 10, 110, 210 alone or in combination with other elements, as explained hereinafter, and a fixed part including at least the casing 80 intended to receive the removable part.

The storage container 10 may be produced in various ways.

Figure 3:
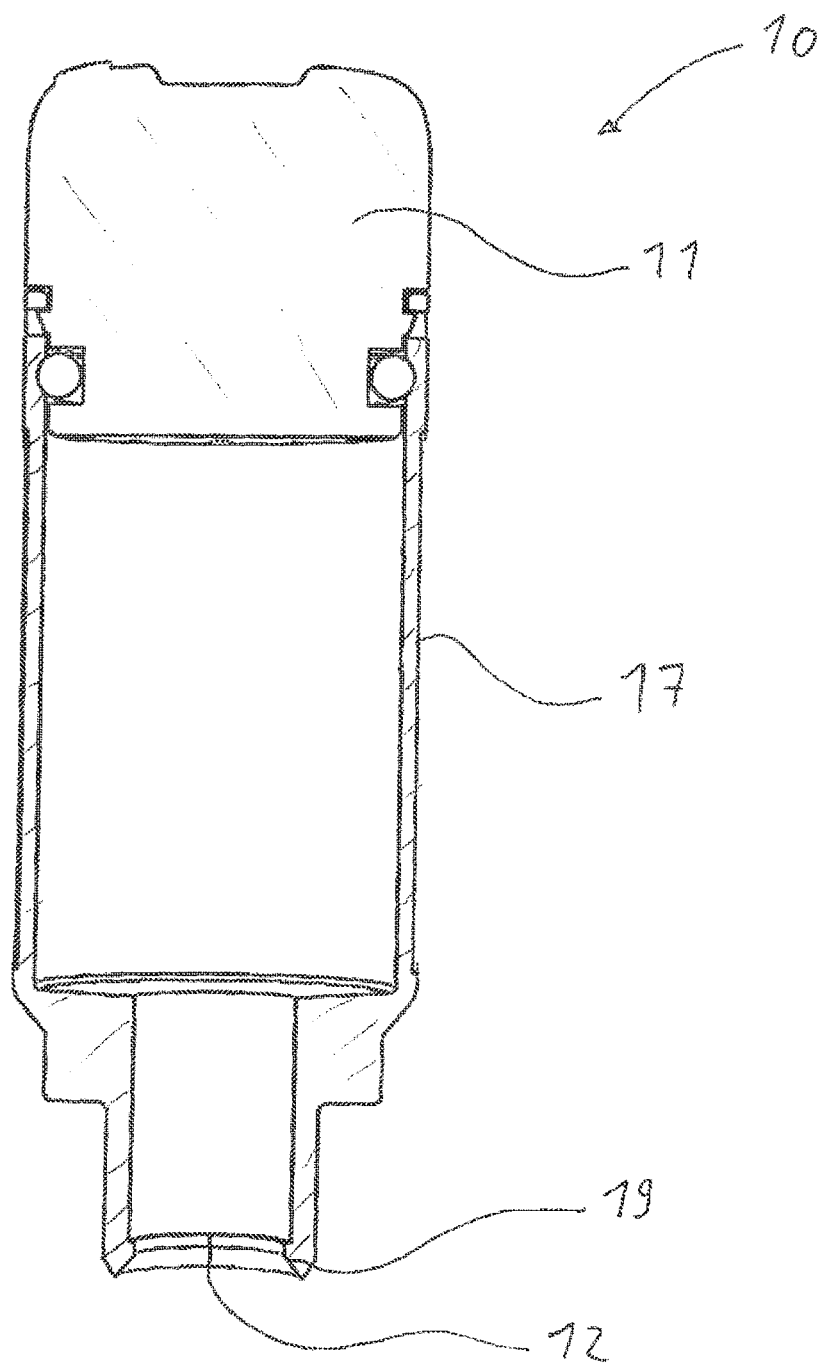
FIG. 3 represents a storage container in accordance with a first embodiment.

FIG. 3 illustrates a storage container 10 that includes a cylindrical hollow body 17 including an upper part closed by a fluid-tight tip 11 and a lower part including an orifice 12 and a retaining lip 19 arranged around the orifice 12. The fluid-tight tip 11 enables the storage container 10 to be sealed after filling it. The orifice 12 enables the substance contained in the storage container 10 to flow to the porous body 30.

Figure 4:
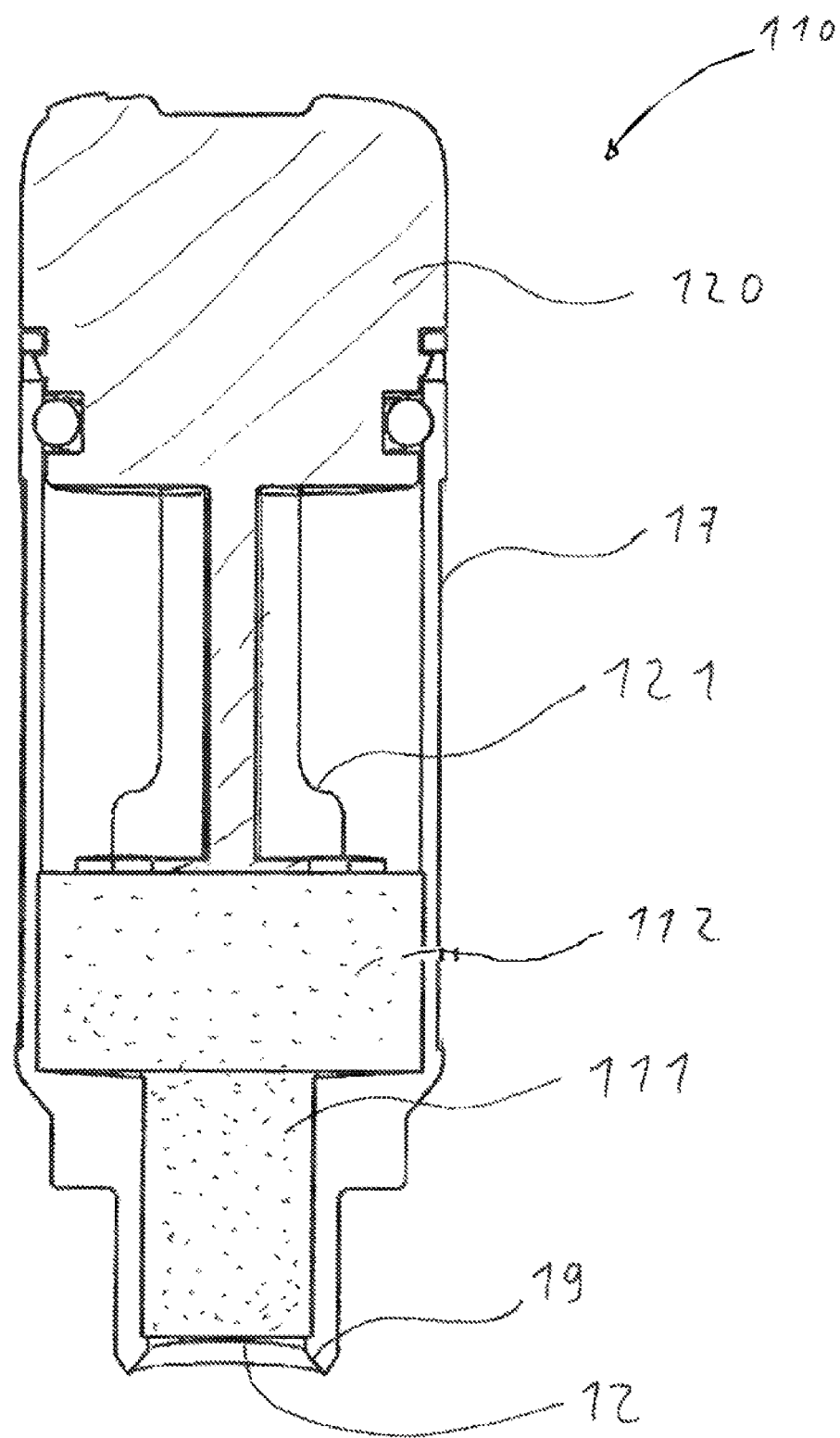
FIG. 4 represents a storage container in accordance with a second embodiment.

In accordance with an embodiment represented in FIG. 4 the storage container 110 contains two blocks of retaining foam. A first foam 111 is arranged in the mouth zone of the storage container 110 set back from the orifice 12 and a second foam 112 is situated in the storage container 110 in contact with the first foam 111. A rod 121 extends into the container from the fluid-tight tip 120. The rod 121 has a cruciform cross section for example. The rod 121 holds the retaining foams in position. The rod 121 exerts a pressure to maintain the second foam 112 in contact with the first foam 111, thereby making it possible to retain the first foam 111 in the mouth zone of the storage container 110. The first foam 111 is set back from the orifice to reduce the risks of accidental contact with exterior elements, which contact could lead to pollution, damage or waste of the liquid substance intended to be diffused. A retaining lip 19 is arranged around the orifice 12. The retaining lip 19 reduces the size of the orifice 12 and enables retention of the cellular retaining member 111 set back from the orifice 12.

Figure 5:
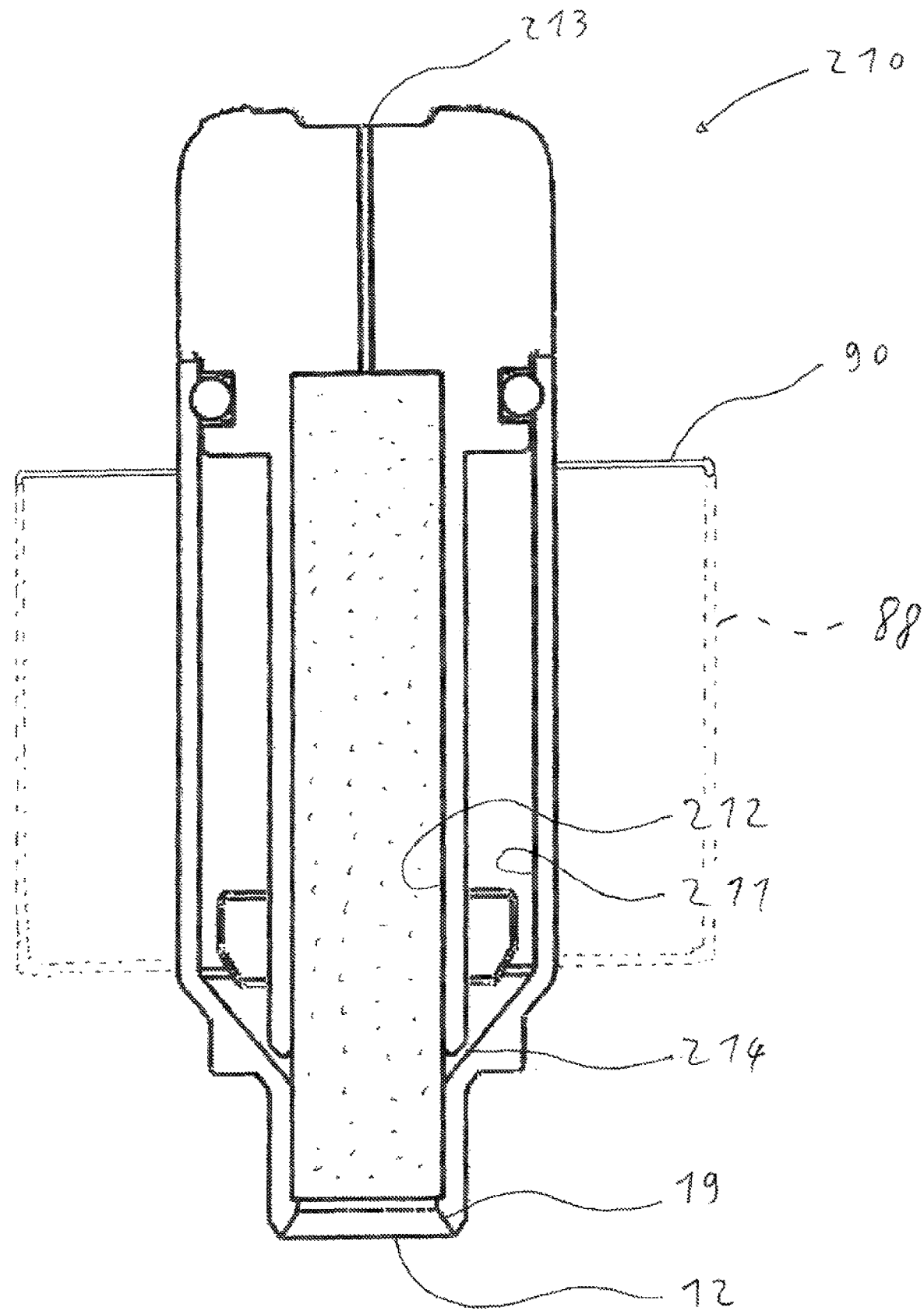
FIG. 5 represents a storage container in accordance with a third embodiment having a double storage container.

FIG. 5 illustrates a storage container 210 in accordance with another embodiment. The storage container 210 includes an outer storage container 211 that is totally closed if it is not at its end in contact with an inner storage container 212. The inner storage container 211 is surmounted by a vent 213 at its upper end. The vent 213 enables balancing of pressure between the air outside and inside the inner storage container 212. The inner storage container 212 contains a cellular retention member, for example a sponge or a cellular foam, that is intended to come into contact with the porous body (not represented here) through the orifice 12. A retaining lip 19 is arranged around the orifice 12 and enables retention of the cellular retaining member 111 set back from the orifice 12. Thus as each drop flows to the porous body the pressure in the inner storage container 212 is balanced via its vent 213 and leads to a drop in level. By communicating via the junction 214 between the two storage containers, the outer storage container 211 refills the inner storage container 212, but the depressurization of the outer storage container 211 then increases in the part of the storage container where there is no or no longer any liquid. Thus the inner storage container 212 is balanced with the depressurization of the outer storage container 211. The inner storage container 212 is nevertheless always able to exit this equilibrium state thanks to its vent 213 and the traction produced by the porous body of the distributor member (not represented here). For the flow to be able to occur normally, when placing the storage container 210 in the fixed part of the diffusing apparatus, the outer storage container 211 is completely filled with the substance.

FIG. 5 also shows that a flange 90 may be arranged projecting around the storage container 210 and adapted to cover an opening of a fixed part of the diffusing apparatus during its insertion. In this case, the fixed part of the diffusing apparatus does not necessarily include a lid. The flange 90 can be positioned at will anywhere on the length of the container 210.

The fixed part may contain all or part of a mixer chamber, as sketched at 88. In accordance with one embodiment, the flange 90 constitutes the upper wall of the mixer chamber 88 to close the latter when the removable assembly is inserted in the operating position. Alternatively, the upper wall 90 could be rigidly connected to the fixed part rather than the removable assembly. In this case, the storage container 210 comes to close the mixer chamber 88 on being inserted into a central opening in the upper wall 90 the diameter of which is equal to the outside diameter of the storage container 210.

Figure 6:
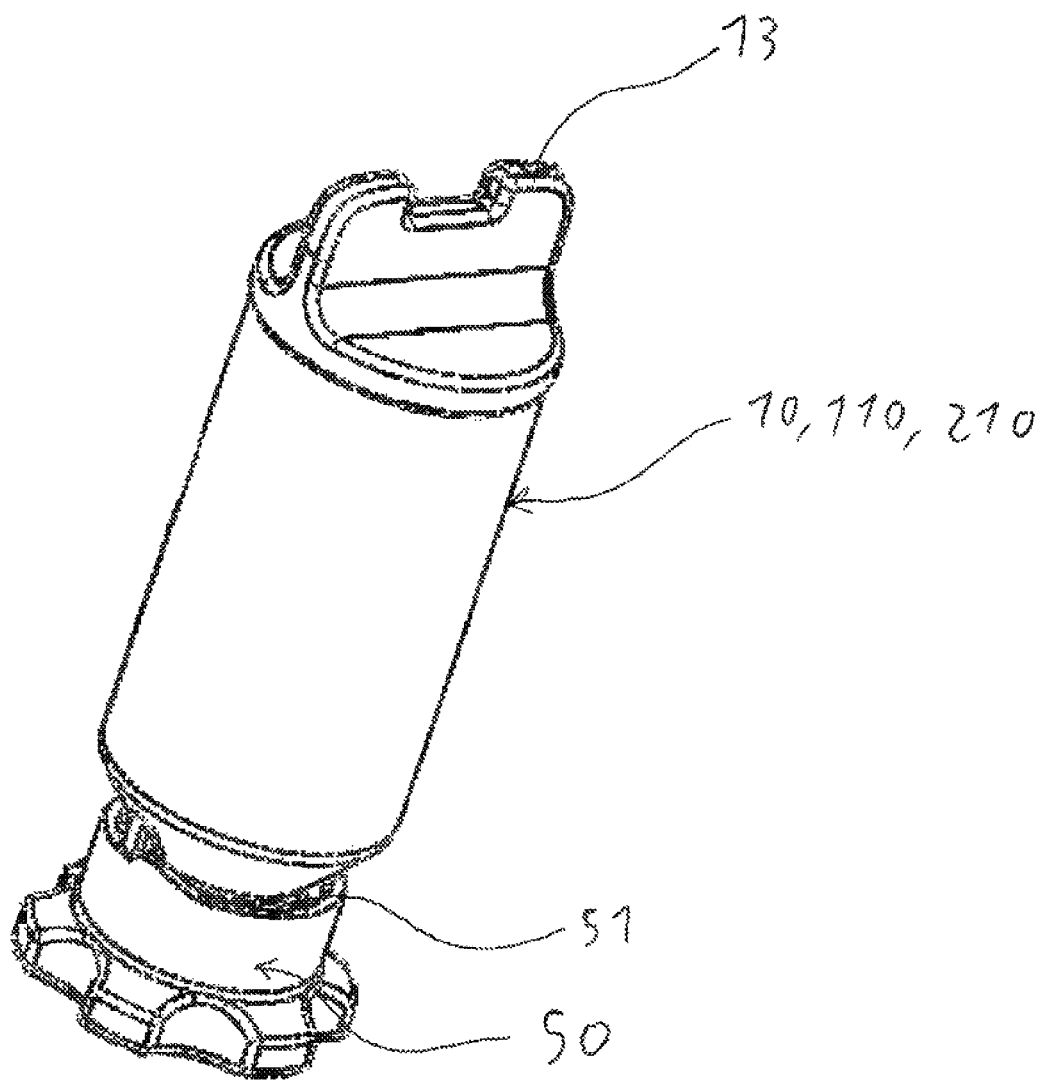
FIG. 6 is a perspective view that represents a storage container including a stopper in accordance with one embodiment.

Referring to FIG. 6, the opening 12 of the storage container 10, 110, 210 is equipped with a stopper 50 in order to prevent the liquid substance contained in the storage container 10, 110, 210 flowing out when the storage container is not being used and/or when it is being transported. This stopper 50 includes a ring 51 supporting an O-ring. The stopper 50 may be fixed on by screwing it on or by clipping it on for example. The use of a stopper facilitates the transportation of the container 10, 110, 210 and makes it possible to avoid potentially costly losses of substances. The sealed stopper enables losses of substance to be avoided even in the event of dropping, an impact or other disturbance.

Figure 7:
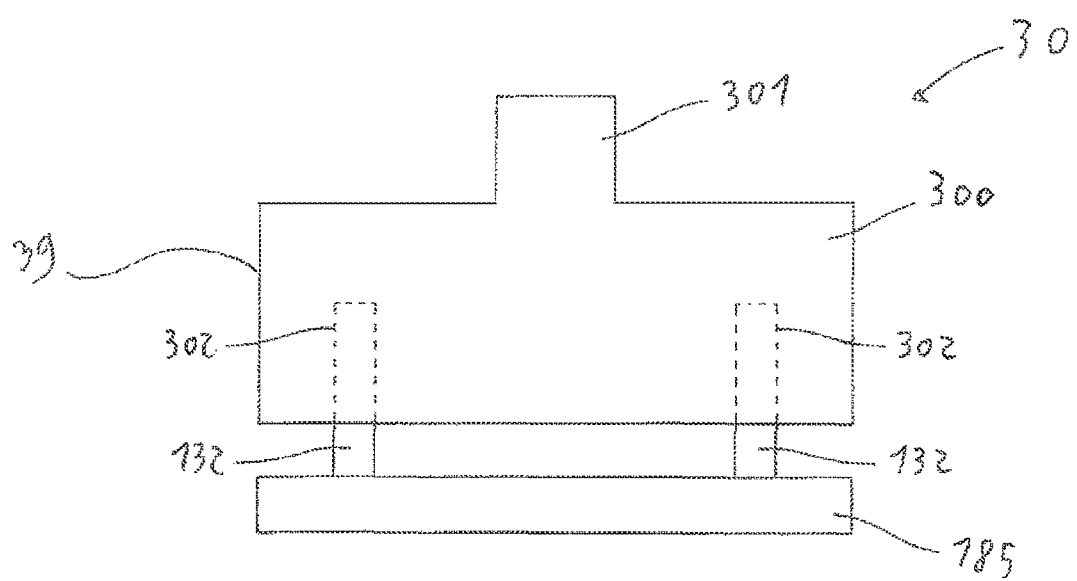
FIG. 7 represents a distributor member with heating members in accordance with one embodiment.

FIG. 7 represents an embodiment of the porous body 30. The porous body 30 includes a main part 300 that has a cylindrical shape surmounted by a lug 301. That lug enables the substance to be conveyed toward the main part 300 of the porous body 30. On the side of the porous body 30 opposite that carrying the lug 301 two recesses 302 are formed in order for each to receive a heating element 132 and/or a temperature sensor. The heating elements 132 are electric resistors supplied with power by an electric circuit 185. The temperature sensor may be a thermistor. The peripheral surface of the main part 300 forms an evaporation surface 39 onto which open microchannels formed by the porosity of the porous body 30.

The porous body 30 may be integrated into the removable assembly with the container 110 or 210. In this case, the lug 301 will be inserted in the orifice 12 to compress the cellular retaining member situated in the mouth zone of the storage container 110, 210. The porous body 30 may equally well have a uniform or non-uniform porosity. The open porosity is preferably 25% in the core and 45% at the surface. This will then be a porous body in which the open porosity, that is to say the volume of the pores per unit volume of the porous body, increases from the core toward the evaporation surface, this structure favors greater spreading over the entirety of the surface of the porous body from the outlet of the pores and strengthens the mechanical integrity of the porous core with a more dense core.

Figure 8:
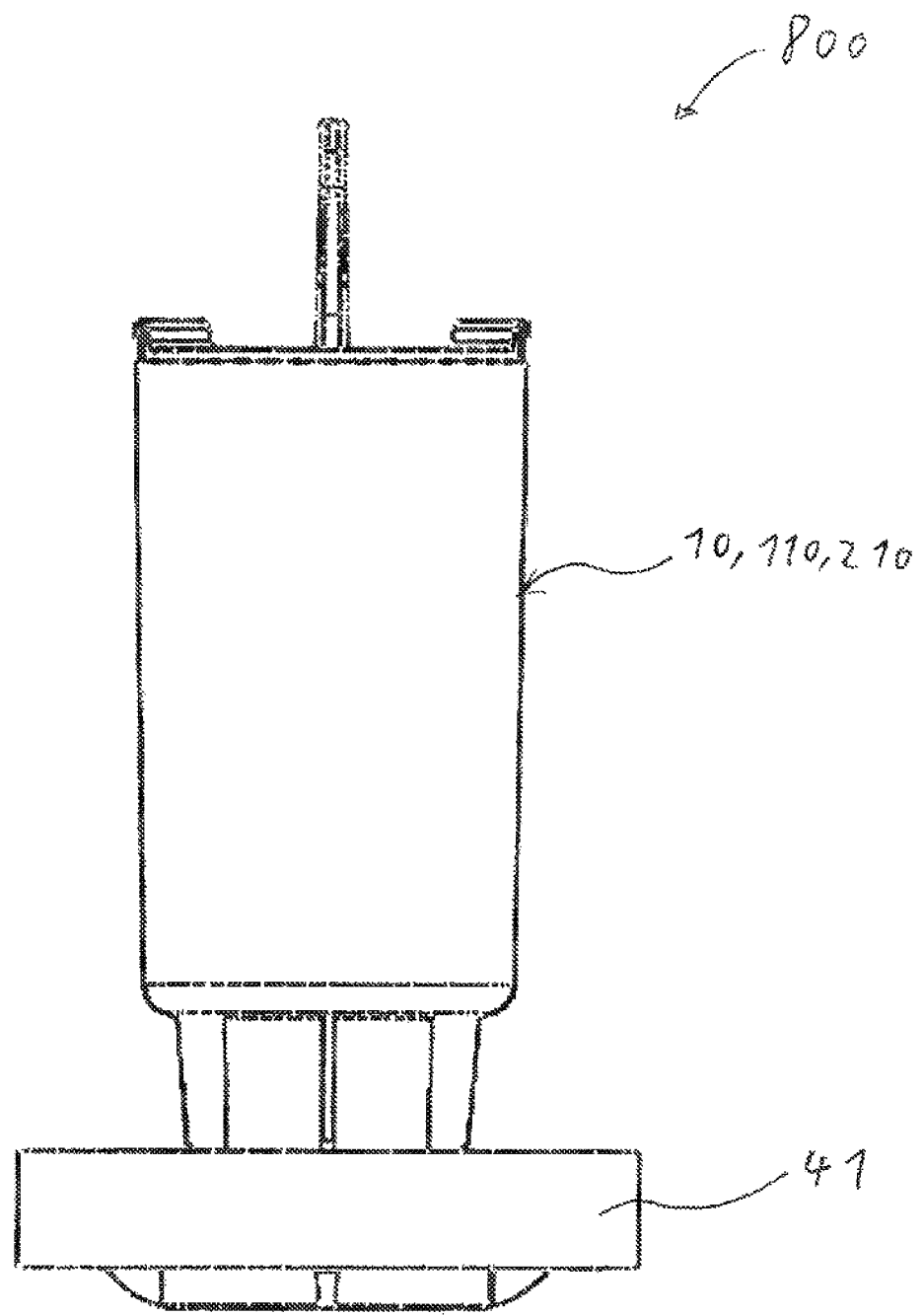
FIG. 8 represents a removable assembly including a storage container and an air flow guide in accordance with one embodiment.

The FIG. 8 embodiment illustrates a removable assembly 800 including a storage container 10, 110, 210 and an air flow guide 41 situated at the periphery of the orifice 12. The air flow guide 41 is intended to guide a flow of air in a particular direction. This removable assembly 800 is intended to be mounted in the first part of the diffusing apparatus including in particular an airflow generator and a distributor member. The air flow generated by the air flow generator in the direction of the air flow guide 41 will then be guided in the direction of the distributor member of the fixed part of the diffusing apparatus.

Figure 9:
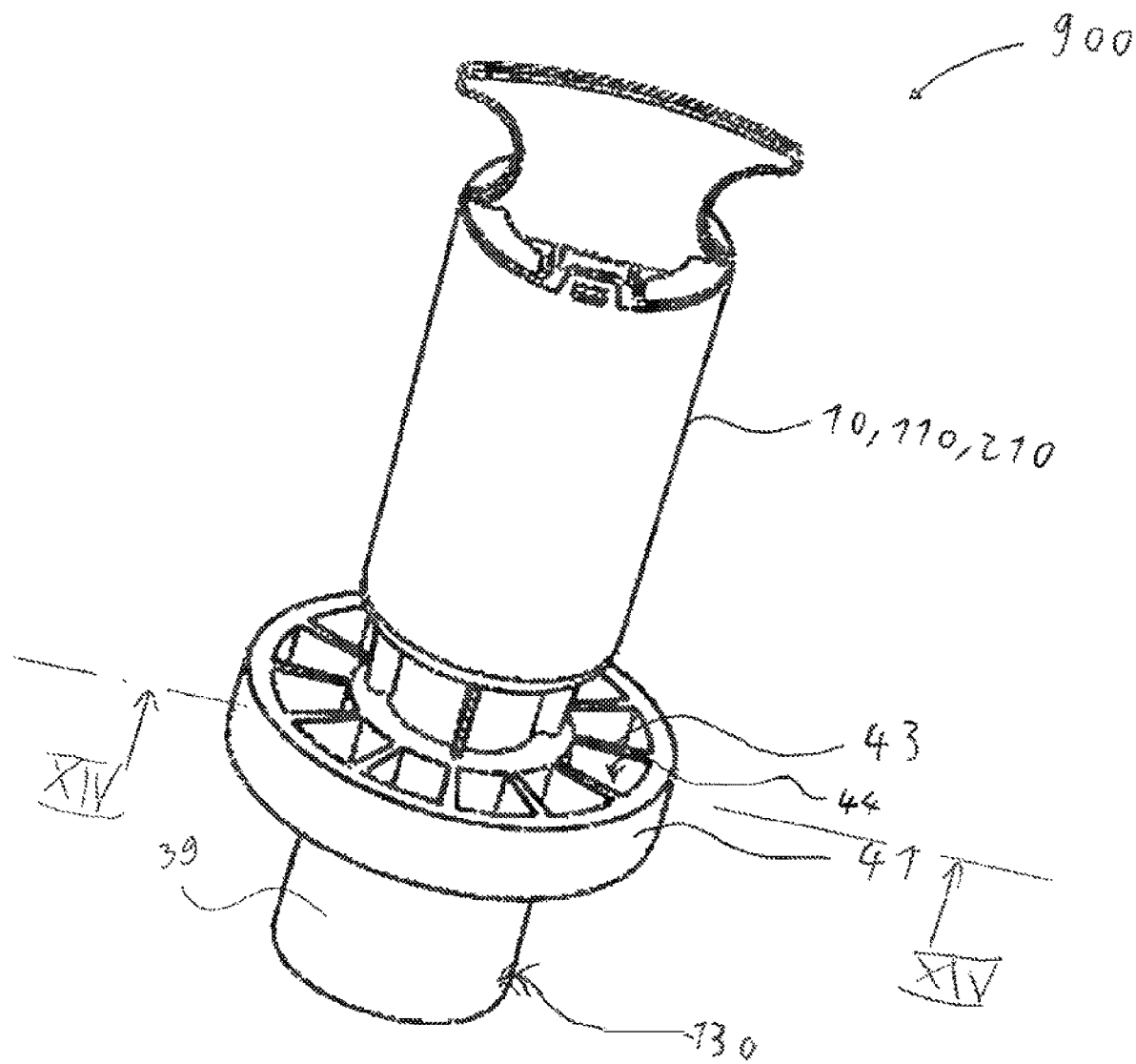
FIG. 9 is a perspective view that represents a removable assembly including a storage container, an air flow guide and a distributor member in accordance with one embodiment.

FIG. 9 illustrates an embodiment of a removable assembly 900 that includes in addition to the elements from FIG. 8 a porous body 130 connected to the orifice 12. The porous body 130 is intended to be connected to heating elements situated in the fixed part of the diffusing apparatus. The diffusion of the substance may be regulated by controlling the temperature of the porous body 130 using one or more heating members integrated into the fixed part of the diffusing apparatus. The air flow guide 41 includes a plurality of parallel fins 43 delimiting channels 44 enabling the flow of air to be guided in the direction of the porous body 130.

Figure 10:
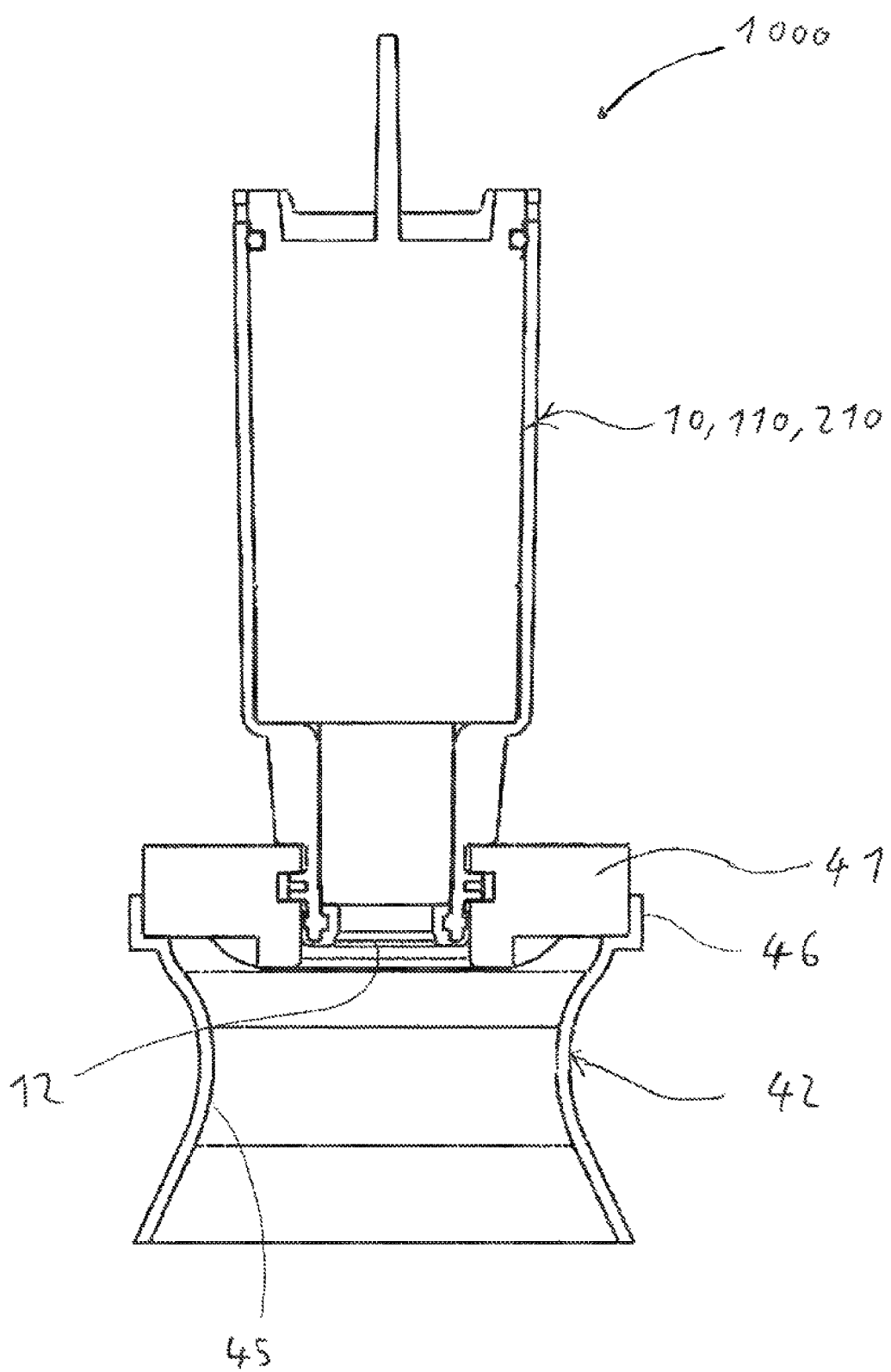
FIG. 10 is a view in section that represents a removable assembly including a storage container, the air flow guide and the chute in accordance with one embodiment.
Figure 11:
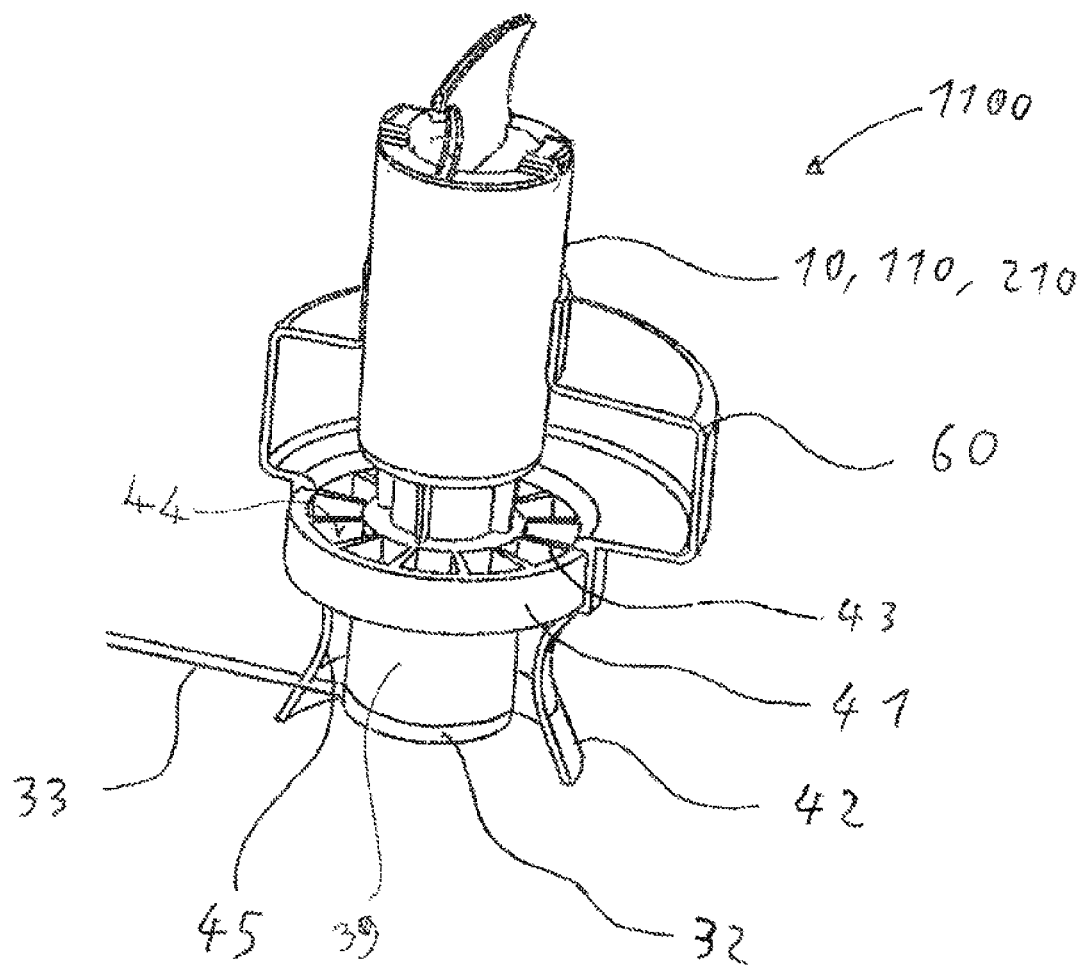
FIG. 11 is a cutaway perspective view that represents a removable assembly including a storage container, an air mixer chamber, an air flow guide, a chute and a distributor member in accordance with one embodiment.
Figure 12:
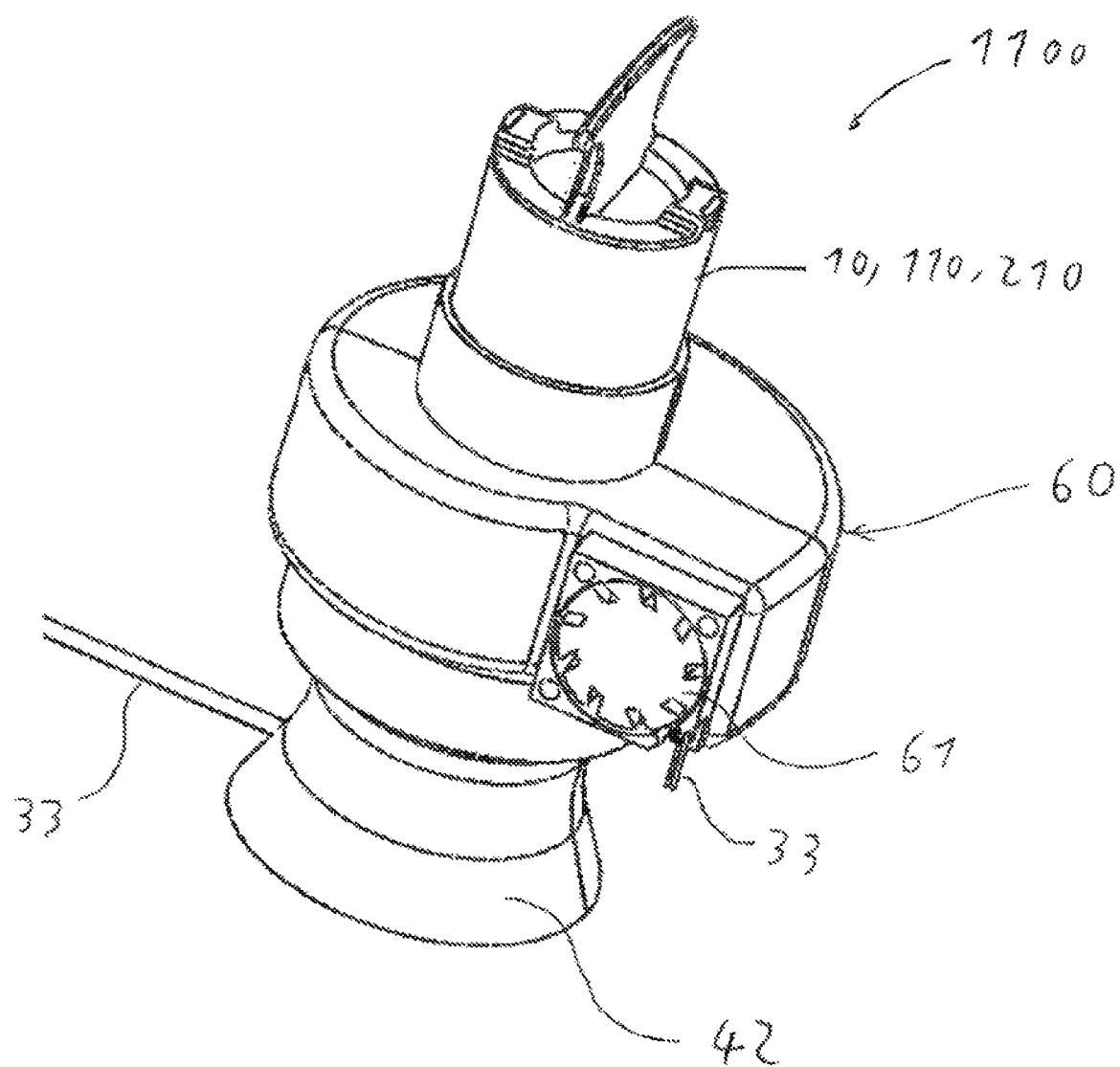
FIG. 12 is a perspective view that represents a removable assembly including a storage container, an air mixer chamber, a fan, an air flow guide and a chute in accordance with one embodiment.
Figure 13:
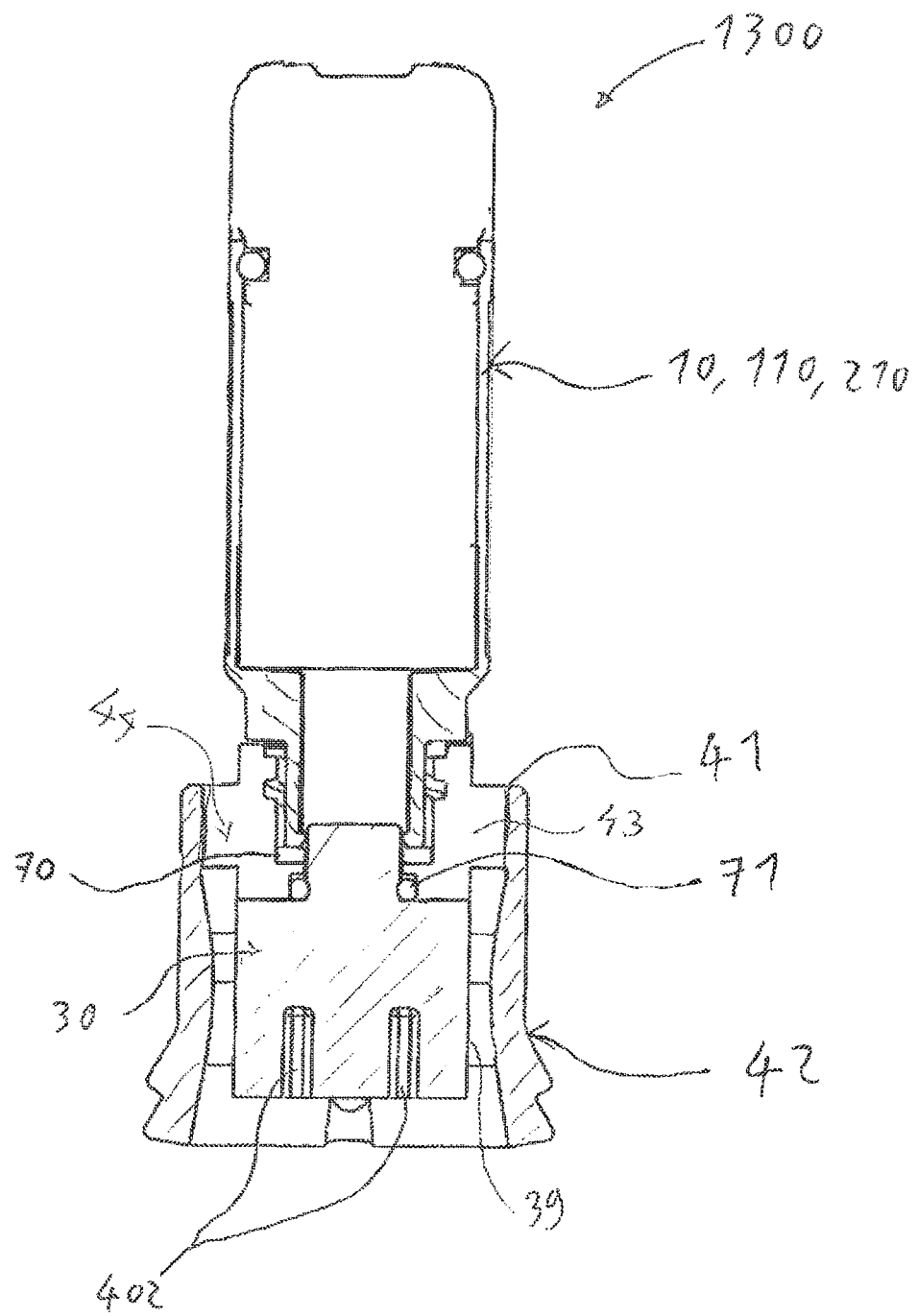
FIG. 13 is a view in section that represents a removable assembly in accordance with one embodiment including a storage container, a distributor member, sealing elements and a chute.
Figure 14:
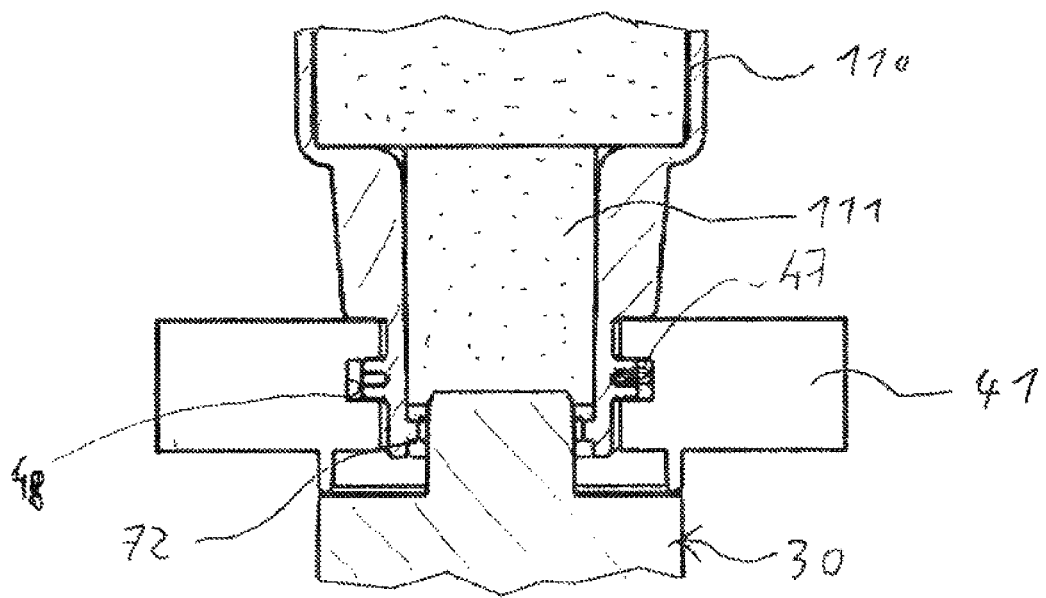
FIG. 14 is a partial view to a larger scale of the removable assembly from FIG. 9 in section taken along the line XIV-XIV.

The FIG. 10 embodiment represents a removable assembly 1000 comprising a storage container 10, 110, 210 associated with an air flow guide 41 situated at the periphery of the orifice 12 and a tubular chute 42 fixed to the air flow guide 41. The chute 42 is a body of revolution the interior space 45 of which has a convergent and then divergent section. The smallest section is located approximately at the level of the half-length of the porous body 30. An upper rim 46 of the chute 42 comes to be attached around the flow guide 41, for example by clipping it on. The chute 42 enables the flow of air to be guided over the porous body 30, favoring evaporation of the substance in the required direction, namely toward the bottom of the casing 80. In this embodiment the porous body and the air flow generator may be situated in the fixed part of the diffusing apparatus.

FIG. 11 and FIG. 12 illustrate a removable assembly 1100 including a container 10, 110, 210, an air mixer chamber 60 arranged around the storage container 10, 110, 210, an air flow guide 41 including a plurality of fins 43, and a chute 42. The fins 43 are parallel to the axial direction and disposed around said storage container 10, 110, 210. The air mixer chamber 60 may include a fan 61.

The porous body 30 carries an electric heating element 32. An electrical junction 33 enables connection of the electric heating element 32 to a power supply circuit situated in the fixed part of the diffusing apparatus.

In operation, the electric heating element 32 will cause heating of the porous body 30, reduction of the viscosity of the liquid substance and consequently flow of the liquid substance from the mouth of the storage container in the direction of the distributor member. The liquid therefore rises to the top of the pores of the porous body 30 by capillarity, which together constitute the evaporation surface that is therefore situated at the periphery of the porous body 30.

When a flow of air penetrates the air mixer chamber 60 it is then directed via the air flow guide 41 and the chute 42 tangentially onto the evaporation surface 39 to cause evaporation of the substance on the surface and its transportation in the vapor state in the direction of the flow of air.

The capillary force is caused by the nature of the surface, which is made up of channels or pores sufficiently narrow to generate capillary traction. The capillary traction and retention force must enable the liquid to rise to the top of the pores of the evaporation surface 39; however, this must occur without allowing uncontrolled spreading over the evaporation surface 39 by forces due to the gravity field (terrestrial attraction and hydrostatic pressure of the liquid column potentially present) or static attraction forces generated by interactions between the solution and the rest of the surface of the porous body 30.

This capillary traction exists only by renewal of the final volume block (the cylindrical liquid section at the top of the pore). This volume is renewed by evaporation and is governed by the equilibrium of the concentrations of liquid and gas molecules at the liquid and gas interface in accordance with a parameter specific to each solution and depending mainly on temperature (at atmospheric pressure), namely the saturated vapor pressure. Increasing the temperature of the solution to be evaporated leads to an increase in the saturated vapor pressure, and therefore movement of the equilibrium of the liquid and gas molecule concentrations at the interface toward the gas molecules: evaporation continues until equilibrium is established again. If the gas phase is mobile, equilibrium is never achieved and evaporation continues until the liquid phase is exhausted. The more mobile the gas phase (the faster molecules tend to be evacuated to the gas phase), the faster the evaporation.

In the position of use the fan 61 remains connected by electronic junction to the electronic card 85 and an electric energy generator 86. The fan 61 generates a flow of air in the mixer chamber 60 in a direction perpendicular to the fins 43 of the flow guide. The flow of air is disturbed and undergoes a change of direction at the fins 43 of the flow guide 60 and penetrates the chute 42, after which the flow of air is directed toward the porous body 30 including the heating element 32. As explained above, heating the porous body 30 is going to decrease the viscosity of the substance and with the flow of air this will enable evaporation of the substance into the exterior environment. In a variant of this embodiment, the fan 61 is mounted in the fixed part of the diffusing apparatus and there is an orifice in the mixer chamber 60 enabling integration of the fan 61 when the removable assembly is mounted in the fixed part of the diffusing apparatus.

FIG. 13 represents a removable assembly 1300 including a container 10, 110, 210, a flow guide 41 and a chute 42 situated all around the porous body. The flow guide 41 and the chute 42 may be formed in one piece. A double seal is provided between the container 10, 110, 210, the chute 42 and the porous body 30. A sealing element 70 is situated between the container 10, 110, 210 and the chute 42 and a sealing element 71 is situated between the chute 42 and the porous body 30. The porous body 30 includes two recesses 402 each shaped to receive a heating element 132 and/or a temperature sensor. In this embodiment, in the position of use the two recesses of the removable assembly come to nest with two heating elements 132 of the fixed part of the diffusing apparatus.

FIG. 14 illustrates a section of the removable assembly 900 including a storage container 110, an air flow guide 41 and a porous body 30. The porous body 30 is inserted in the orifice 12 of the container 110 until it comes to compress the cellular retaining member 111, then forming a contact junction. The flow guide 41 is arranged around the storage container 110 at the level of the junction between the storage container 110 and the porous body 30. An O-ring 72 is fitted at the level of the junction between the storage container 110 and the porous body 30. Another seal 47 may be accommodated in a groove 48 in the flow guide 41. In the position of use the seals make it possible to constrain the liquid to flow in the direction of the porous body 30 without any associated substance leak. The seals may be single, double, radial and/or compressive, for example.

Although the invention has been described in connection with particular embodiments it is obvious that it is in no way limited to them and that it encompasses all technical equivalents of the means described and combinations thereof if the latter fall within the scope of the invention.

The use of the verb "include" or "comprise" and conjugate forms thereof does not exclude the presence of elements or steps other than those stated in the claim.

In the claims, any reference sign between parentheses should not be interpreted as a limitation of the claim.

EXAMPLES

A number of embodiments of the diffusing apparatus 1 have been constructed and tested.

Experiment 1

The active molecule used is (7E,9Z)-Dodeca-7,9-dienylacetate having a flash point of 137° C., a mass per unit volume (at 20° C.) of 0.903 g/cm3, a viscosity of 8 mPa·s at 23° C. and a saturated vapor pressure of 0.15 Pa at 15° C.

The composition studied comprises:
- 99.5% by weight of (7E,9Z)-Dodeca-7,9-dienylacetate, and
- 0.5% by weight of BHT (butylated hydroxytoluene).

This compound is known under the product name Rak® 2 New and will be used in the storage container for this experiment.

Three systems were studied:

The porous body is a sintered alumina ceramic wick having a pore size of 100 nm and a uniform porosity of 40%.

System 1:
The evaporation area of the wick is 7.9 cm², the wick has a diameter of 2.3 cm (centimeters) and a height of 1.2 cm. The mean velocity of the flow of air around the surface is 0.2 m/s. The outside temperature is 25° C.

System 2:
The evaporation area of the wick is 15.5 cm², the wick has a diameter of 2.6 cm (centimeters) and a height of 1.9 cm. The mean velocity of the flow of air around the surface is 0.45 m/s. The outside temperature is 25° C.

System 3:
The evaporation area of the wick is 22.8 cm², the wick has a diameter of 2.8 cm (centimeters) and a height of 2.6 cm. The mean velocity of the flow of air around the surface is 0.50 m/s. The outside temperature is 25° C.

| Control temperature | Ambient | 52° C. | 58° C. |
| --- | --- | --- | --- |
| RAK 2 evaporation (mg/h) on System 1 | 0 | 1.9 | 3.8 |
| System | System 1 | System 2 | System 3 |
| Evaporation area (cm²) | 7.9 | 15.5 | 22.8 |
| RAK 2 evaporation (mg/h) at 58° C. | 3.8 | 8.9 | 12.2 |
| Non-evaporation threshold temperature ° C. | 33 | 33 | 33 |

The measurements are conducted in accordance with a relative mass loss protocol of the system, considering (by visual observation) that any loss of mass arises from evaporation followed by expulsion of the molecules out of the system.

Experiment 2

The molecule used is isopropyl myristate having a flash point of 160° C., a mass per unit volume of 0.855 g/cm3 at 20° C., a dynamic viscosity of 5.58 mPa·s at 20° C. and a saturated vapor pressure of 100 Pa at 20° C.

System 1:
The evaporation area of the wick is 7.9 cm², the wick has a diameter of 2.3 cm (centimeters) and a height of 1.2 cm. The mean velocity of the flow of air around the surface is 0.2 m/s. The outside temperature is 25° C.

System 2:
The evaporation area of the wick is 15.5 cm², the wick has a diameter of 2.6 cm (centimeters) and a height of 1.9 cm. The mean velocity of the flow of air around the surface is 0.2 m/s. The outside temperature is 25° C.

System 3:
The evaporation area of the wick is 15.5 cm², the wick has a diameter of 2.6 cm (centimeters) and a height of 1.9 cm. The mean velocity of the flow of air around the surface is 0.45 m/s. The outside temperature is 25° C.

| Control temperature | Ambient | 50° C. | 60° C. | 70° C. |
| --- | --- | --- | --- | --- |
| Isopropyl myristate evaporation (mg/h) on System 1 | 0 | 8.9 | 23.1 | 45.5 |
| System | | System 1 | System 2 | System 3 |
| Evaporation area (cm2) | | 7.9 | 15.5 | 15.5 |
| Isopropyl myristate evaporation (mg/h) at 55° C. | | 19.5 | 21.1 | 44.4 |
| Non-evaporation threshold temperature ° C. | | 36 | 36 | 36 |

The measurements are conducted in accordance with a relative mass loss protocol of the system, considering (by visual observation) that any loss of mass arises from evaporation followed by expulsion of the molecules out of the system.

The invention claimed is:

1. A removable assembly for a diffusing apparatus (1), the diffusing apparatus (1) comprising a substance to be diffused in a vapor state into surrounding air, the removable assembly comprising:
   a storage container (10), said storage container (10, 110, 210) including an orifice (12), said storage container (10, 110, 210) containing said substance; said substance including at least one substance selected from semiochemical molecules, pheromones, allomones, kairomones, synomones and fragrances of natural or synthetic origin;
   a distributor member (30, 130) positioned at an outlet of said orifice (12) and connected to said orifice (12) to evaporate the substance into the surrounding air;
   said distributor member (30, 130) including a porous body (30, 130) having an evaporation surface (39) situated outside said storage container (10, 110, 210);
   wherein the orifice of the container connected to the distributor member is oriented downward in a direction of acceleration due to gravity when the diffusing apparatus is in a position of use;
   wherein said substance has a viscosity varying as a function of temperature, said viscosity and a surface tension of the substance being such that when the acceleration due to gravity is exerted from the orifice (12) in the direction of the porous body (30, 130) in such a manner as to constitute a motive force susceptible of generating a flow from the storage container towards said evaporation surface (39), said substance does not flow through said porous body (30, 130) at an ambient temperature below a first temperature, the first temperature being greater than 0° C., and said substance flows through said porous body (30, 130) at a second temperature higher than said first temperature; and
   wherein said removable assembly includes an air flow guide (41) situated at a periphery of said orifice (12), said air flow guide (41) configured to guide a flow of air in a direction tangential to the evaporation surface (39), in which said removable assembly includes sealing elements for producing sealed connections between the storage container (10) and said air flow guide (41) and between the air flow guide (41) and said porous body (30, 130).

2. The removable assembly as claimed in claim 1, wherein the first temperature is between 1 and 50° C.

3. The removable assembly as claimed in claim 1, wherein said removable assembly includes a heating member (32) for heating said porous body (30, 130) and an electric contact (33) associated with the heating member and intended to make an electric connection with a fixed part of the diffusing apparatus (1).

4. The removable assembly as claimed in claim 3, further including at least one regulation electronic element configured to regulate the heating member (32).

5. The removable assembly as claimed in claim 1, wherein the porous body (30, 130) includes pores having a diameter between 0.01 and 10 μm.

6. The removable assembly as claimed in claim 1 wherein said storage container (10) has an elongate shape in an axial direction, said orifice (12) being situated at an axial end of the storage container (10), the evaporation surface (39) of the porous body (30, 130) being parallel to the axial direction, said air flow guide (41) including a plurality of fins 43 parallel to the axial direction and disposed around said storage container (10).

7. The removable assembly as claimed in claim 1, wherein said removable assembly includes a tubular chute (42) extending around the porous body (30, 130), said tubular chute (42) enabling the flow of air to be guided onto said porous body (30, 130).

8. The removable assembly as claimed in claim 1, wherein said removable assembly includes some or all of an air mixer chamber (60), said air mixer chamber (60) extending all around said storage container (10).

9. The removable assembly as claimed in claim 8, wherein said air mixer chamber (60) includes an opening allowing connection to a fan.

10. The removable assembly as claimed in claim 9, wherein said air mixer chamber (60) includes a fan (61) and an electric connector 33, said fan (61) positioned to generate a flow of air in said air mixer chamber (60), said electric connector (33) coupled with an electric connector in a fixed part of the diffusing apparatus (1) to supply power to the fan (61).

11. The removable assembly as claimed in claim 8, wherein the porous body (30, 130) and includes pores having a diameter between 0.01 and 10 μm,
wherein said removable assembly includes an air flow guide (41) situated at a periphery of said orifice (12), in which said air flow guide (41) includes a plurality of channels (44) opening into the air mixer chamber (60) and oriented in a direction tangential to the evaporation surface (39).

12. The removable assembly as claimed in claim 1, wherein said removable assembly includes a flange (90) projecting around the storage container (10) and adapted to cover an opening in a fixed part of the diffusing apparatus (1), said opening for insertion of said removable assembly in the fixed part of the diffusing apparatus (1).

13. The removable assembly as claimed in claim 1, wherein the storage container (10) includes a pressurization chamber (213) establishing communication between an interior space of the storage container (212) and the surrounding air.

14. The removable assembly as claimed in claim 1, further including a stopper (50) disposed to block said orifice (12) in sealed manner during transportation of said removable assembly.

15. The removable assembly as claimed in claim 1, wherein:
the storage container (110, 210) has an elongate shape in an axial direction, said orifice (12) being situated at an axial end of the storage container (110, 210),
said substance being liquid and including at least one substance selected from semiochemical molecules, pheromones, allomones, kairomones, synomones and fragrances of natural or synthetic origin,
said storage container (110, 210) configured to be assembled in a sealed manner to the distributor member (30, 130), the porous body (30, 130) having an end portion suitable for being engaged in the orifice (12) and the evaporation surface (39) being parallel to the axial direction of the storage container (110, 210), and said assembly comprising
an inner cellular retaining member (111) being accommodated at least in a mouth zone of said storage container (110, 210) adjacent to the orifice (12) and being set back from the orifice (12) so as to be able to be in contact with said end portion when said end portion is engaged in the orifice (12), and
a seal (72) arranged around the orifice (12) to allow assembling the porous body (30, 130) in a sealed manner to said storage container (110, 210) and thereby establish a sealed connection between the storage container (110, 210) and the distributor member (30, 130).

16. The removable assembly as claimed in claim 15, wherein a plurality of inner cellular retaining members are disposed in said storage container (110, 210).

17. The removable assembly as claimed in claim 16, wherein a first inner cellular retaining member (111) situated in said mouth zone of said storage container (110, 210) is stiffer than a second inner cellular retaining member (112) situated at a distance from the mouth zone.

18. The removable assembly as claimed in claim 15, wherein a rod (121) fixed to an end of said storage container (110, 210) opposite said orifice (12) in said storage container (110, 210) extends from the end of said storage container (110, 210) opposite said orifice (12) to hold said inner cellular retaining member in place at least in said mouth zone.

19. The removable assembly as claimed in claim 15, wherein said removable assembly (900, 1100, 1300) includes said distributor member (30, 130), the distributor member (30, 130) being positioned at the outlet of the orifice (12) to evaporate the substance into the surrounding air, said end portion of the distributor member (30, 130) being engaged in the orifice (12) to come into contact with said inner cellular retaining member (111) and said evaporation surface (39) being situated outside said storage container (110, 210), said porous body (30, 130) being assembled to said storage container (110, 210) in sealed manner by the seal (72).

20. The removable assembly as claimed in claim 19, wherein said removable assembly (900, 1100) includes an electric heating member (32) enabling heating of said porous body (30, 130) and an electric contact associated with the electric heating member (32) and intended to make an electric connection with a fixed part of the diffusing apparatus (1).

21. The removable assembly as claimed in claim 20, further including at least one electronic regulator element configured to regulate the electric heating member (32).

22. The removable assembly as claimed in claim 20, wherein the porous body (30, 130) has pores having a diameter between 0.01 and 10 μm.

23. A diffusing apparatus (1) comprising:
   said removable assembly (900, 1000, 1100, 1300) as claimed in claim 22, and
   a fixed part including a casing (80) that defines a housing in which said removable assembly is inserted in an operating position enabling diffusion of the substance in the vapor state into the surrounding air.

* * * * *